(12) United States Patent
Poley et al.

(10) Patent No.: US 12,284,207 B2
(45) Date of Patent: Apr. 22, 2025

(54) SYSTEM FOR GENERATING INFORMATION SECURITY MANAGEMENT PACKAGES THROUGH MALWARE TRACING, LOGGING, AND ANALYSIS

(71) Applicant: Cyborg Security, Inc., Lake Mary, FL (US)

(72) Inventors: Michael Scott Poley, Brunswick, OH (US); Michael Mitchell, Richmond, VA (US)

(73) Assignee: CYBORG SECURITY, INC., Lake Mary, FL (US)

( * ) Notice: Subject to any disclaimer, the term of this patent is extended or adjusted under 35 U.S.C. 154(b) by 194 days.

(21) Appl. No.: 17/961,876

(22) Filed: Oct. 7, 2022

(65) Prior Publication Data

US 2024/0121264 A1  Apr. 11, 2024

(51) Int. Cl.
*H04L 9/40* (2022.01)

(52) U.S. Cl.
CPC ........ *H04L 63/145* (2013.01); *H04L 63/1416* (2013.01); *H04L 63/1433* (2013.01)

(58) Field of Classification Search
CPC ............... H04L 63/145; H04L 63/1416; H04L 63/1433
USPC .......................................................... 726/22
See application file for complete search history.

(56) References Cited

U.S. PATENT DOCUMENTS

| | | | |
|---|---|---|---|
| 6,311,269 B2 | 10/2001 | Luckenbaugh | |
| 7,376,969 B1 | 5/2008 | Njemanze | |
| 7,844,999 B1 | 11/2010 | Aguilar-Macias | |
| 8,056,130 B1 | 11/2011 | Njemanze | |
| 8,561,196 B1 * | 10/2013 | Viljoen | G06F 21/56 |
| | | | 717/170 |
| 8,578,441 B2 | 11/2013 | Giles | |
| 9,100,422 B1 | 8/2015 | Tidwell | |
| 9,501,535 B2 | 11/2016 | Cannaliato | |
| 9,811,562 B2 | 11/2017 | Tidwell | |
| 10,127,273 B2 | 11/2018 | Dickey | |
| 10,176,321 B2 | 1/2019 | Abbasi | |
| 10,257,059 B2 | 4/2019 | Dickey | |
| 10,348,583 B2 | 7/2019 | Dickey | |
| 10,474,680 B2 | 11/2019 | Ramani | |
| 10,599,668 B2 | 3/2020 | McLean | |
| 10,721,275 B2 | 7/2020 | Kung | |
| 10,726,037 B2 | 7/2020 | Robichaud | |
| 10,764,329 B2 | 9/2020 | Sander | |
| 10,791,138 B1 | 9/2020 | Siddiqui | |

(Continued)

*Primary Examiner* — Zi Ye

(74) *Attorney, Agent, or Firm* — Moore & Van Allen PLLC

(57) ABSTRACT

Systems, computer program products, and methods are described herein for generating information security management packages through malware tracing, logging, and analysis. A system in accordance with embodiments of the present invention may be configured for receiving one or more trace log files from one or more artifact data collection computing systems; parsing the artifact data and metadata to identify one or more relationships between the target malware and one or more malware artifacts; based on parsing the artifact data and metadata, generating one or more nodes within a malware graph database; and executing a coverage analysis of an information security management package configured to detect a presence of the target malware.

23 Claims, 3 Drawing Sheets

(56) References Cited

U.S. PATENT DOCUMENTS

| | | | |
|---|---|---|---|
| 10,949,420 B2 | 3/2021 | Curtis | |
| 10,977,271 B2 | 4/2021 | McLean | |
| 2016/0156664 A1 | 6/2016 | Nagaratnam | |
| 2017/0063888 A1* | 3/2017 | Muddu | G06V 10/225 |
| 2017/0251002 A1* | 8/2017 | Rostamabadi | G06F 21/566 |
| 2017/0286038 A1 | 10/2017 | Li | |
| 2017/0286525 A1 | 10/2017 | Li | |
| 2019/0238431 A1 | 8/2019 | Dickey | |
| 2020/0019891 A1 | 1/2020 | Poirel | |
| 2020/0042651 A1 | 2/2020 | Curtis | |
| 2020/0127893 A1 | 4/2020 | Hume | |
| 2020/0250184 A1 | 8/2020 | Frampton | |
| 2020/0272734 A1 | 8/2020 | Tora | |
| 2020/0279055 A1 | 9/2020 | Nambiar | |
| 2020/0285764 A1 | 9/2020 | Nitzan | |
| 2020/0351307 A1 | 11/2020 | Vidas | |
| 2021/0021621 A1 | 1/2021 | Janakiraman | |
| 2021/0073377 A1 | 3/2021 | Coull | |

* cited by examiner

SYSTEM FOR GENERATING INFORMATION SECURITY MANAGEMENT PACKAGES THROUGH MALWARE TRACING, LOGGING, AND ANALYSIS

FIELD OF THE INVENTION

Embodiments of the present invention embrace a system for generating information security management packages through malware tracing, logging, and analysis.

BACKGROUND

An organization's network environment may be subjected to various intrusive and/or disruptive outside elements, such as malware or unauthorized remote access. In response, it may be desirable for the organization to execute certain processes for detection and remediation of such intrusive elements. Accordingly, there is a need for a to generate information security management packages that can efficiently and accurately identify the intrusive elements within the enterprise network environment as well as perform assessment on the efficacy of such information security management packages.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating information security management packages through malware analysis is presented. The system may comprise at least one non-transitory storage device; and at least one processing device coupled to the at least one non-transitory storage device, wherein the at least one processing device is configured for receiving one or more trace log files from one or more artifact data collection computing systems, wherein the one or more trace log files comprise artifact data and metadata associated with a target malware; parsing the artifact data and metadata to identify one or more relationships between the target malware and one or more malware artifacts; based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges; and executing a coverage analysis of an information security management package usable for detecting a presence of the target malware.

In some embodiments, executing the coverage analysis comprises parsing detection logic within the information security management package; and based on the malware graph database, computing a coverage level for the information security management package with respect to a target malware.

In some embodiments, executing the coverage analysis further comprises determining, based on the coverage level, that the information security management package provides partial coverage with respect to the target malware; and updating the information security management package.

In some embodiments, the at least one processing device is further configured for generating the information security management package, wherein generating the information security management package comprises tracing one or more logical pathways from the target malware node to the one or more artifact nodes within the malware graph database; and constructing detection logic for detecting the one or more malware artifacts based on the one or more logical pathways.

In some embodiments, the one or more malware artifacts comprise at least one of a process executed by the target malware, a data file created by the target malware, a registry entry created by the target malware, API calls made by the target malware, image loads accessed by the target malware, or a remote host accessed by the target malware.

In some embodiments, the one or more artifact nodes comprises a process artifact node, the process artifact node comprising one or more properties indicating at least one of a process name, working directory, and hash output value associated with the process.

In some embodiments, the one or more artifact nodes comprises a data file artifact node, the data file artifact node comprising one or more properties indicating at least one of a file name, file type, or storage location associated with the data file.

In some embodiments, the one or more artifact nodes comprises a registry key node, the registry key node comprising one or more properties indicating at least one of a registry key type, registry value, or registry path associated with the registry key.

In some embodiments, the one or more artifact nodes comprises a remote host node, the remote host node comprising one or more properties indicating at least one of an Internet Protocol ("IP") address, port, or domain associated with the remote host.

In another aspect, a computer program product for generating information security management packages through malware analysis is provided. The computer program product may comprise a non-transitory computer-readable medium comprising code causing a first apparatus for receiving one or more trace log files from one or more artifact data collection computing systems, wherein the one or more trace log files comprise artifact data and metadata associated with a target malware; parsing the artifact data and metadata to identify one or more relationships between the target malware and one or more malware artifacts; based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges; and executing a coverage analysis of an information security management package usable for detecting a presence of the target malware.

In some embodiments, executing the coverage analysis comprises parsing detection logic within the information security management package; and based on the malware graph database, computing a coverage level for the information security management package with respect to a target malware.

In some embodiments, executing the coverage analysis further comprises determining, based on the coverage level, that the information security management package provides partial coverage with respect to the target malware; and updating the information security management package.

In some embodiments, the first apparatus is further configured for generating the information security management package, wherein generating the information security management package comprises tracing one or more logical pathways from the target malware node to the one or more artifact nodes within the malware graph database; and constructing detection logic for detecting the one or more malware artifacts based on the one or more logical pathways.

In some embodiments, the one or more malware artifacts comprise at least one of a process executed by the target malware, a data file created by the target malware, a registry entry created by the target malware, API calls made by the target malware, image loads accessed by the target malware, or a remote host accessed by the target malware.

In another aspect, a computer-implemented method for generating information security management packages through malware analysis is provided. The computer-implemented method may comprise receiving one or more trace log files from one or more artifact data collection computing systems, wherein the one or more trace log files comprise artifact data and metadata associated with a target malware; parsing the artifact data and metadata to identify one or more relationships between the target malware and one or more malware artifacts; based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges; and executing a coverage analysis of an information security management package usable for detecting a presence of the target malware.

In some embodiments, executing the coverage analysis comprises parsing detection logic within the information security management package; and based on the malware graph database, computing a coverage level for the information security management package with respect to a target malware.

In some embodiments, executing the coverage analysis further comprises determining, based on the coverage level, that the information security management package provides partial coverage with respect to the target malware; and updating the information security management package.

In some embodiments, the computer-implemented method further comprises generating the information security management package, wherein generating the information security management package comprises tracing one or more logical pathways from the target malware node to the one or more artifact nodes within the malware graph database; and constructing detection logic for detecting the one or more malware artifacts based on the one or more logical pathways.

In some embodiments, the one or more malware artifacts comprise at least one of a process executed by the target malware, a data file created by the target malware, a registry entry created by the target malware, API calls made by the target malware, image loads accessed by the target malware, or a remote host accessed by the target malware.

In some embodiments, updating the information security management package comprises modifying detecting logic within the information security management package based on user input.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
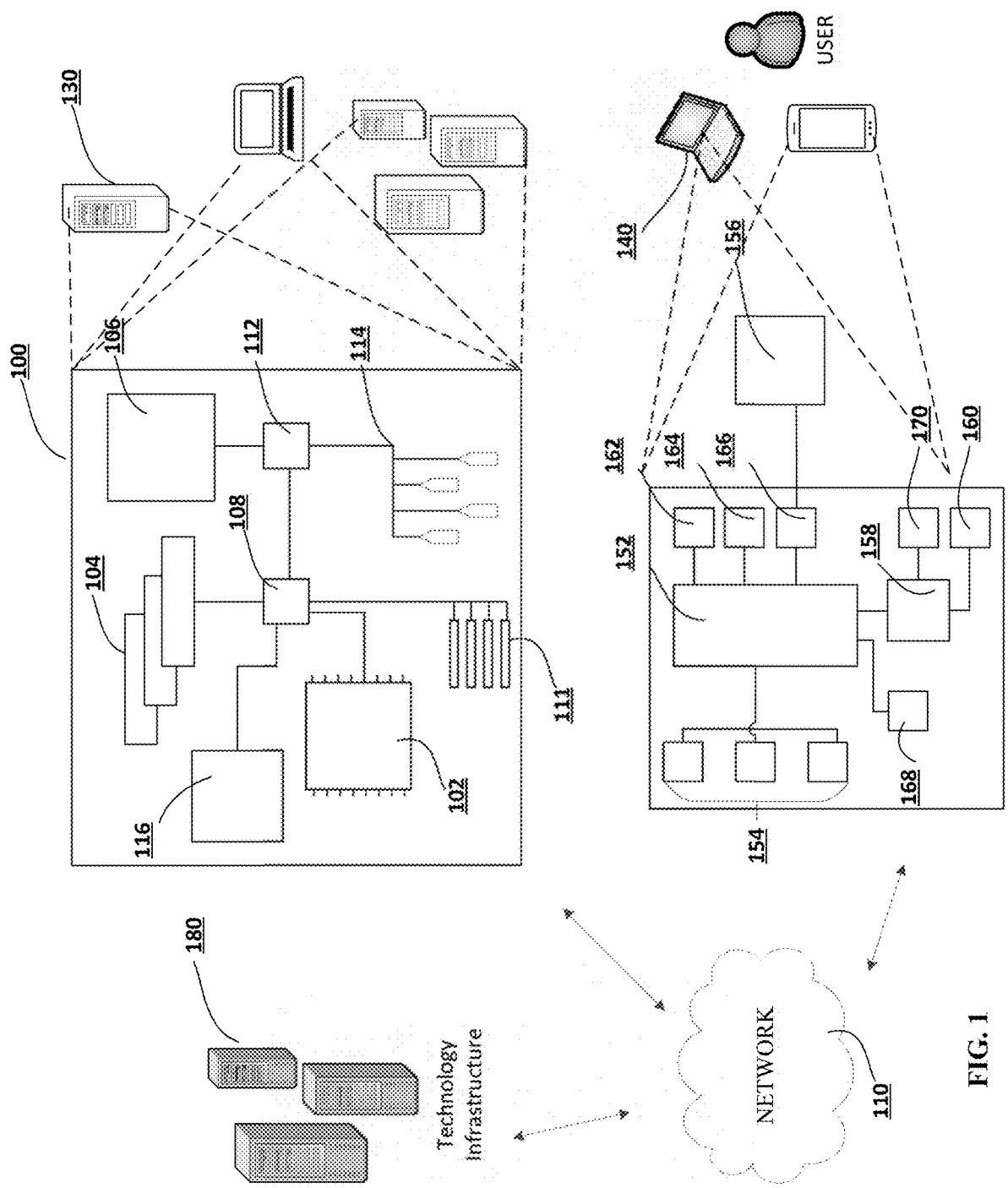
Figure 2:
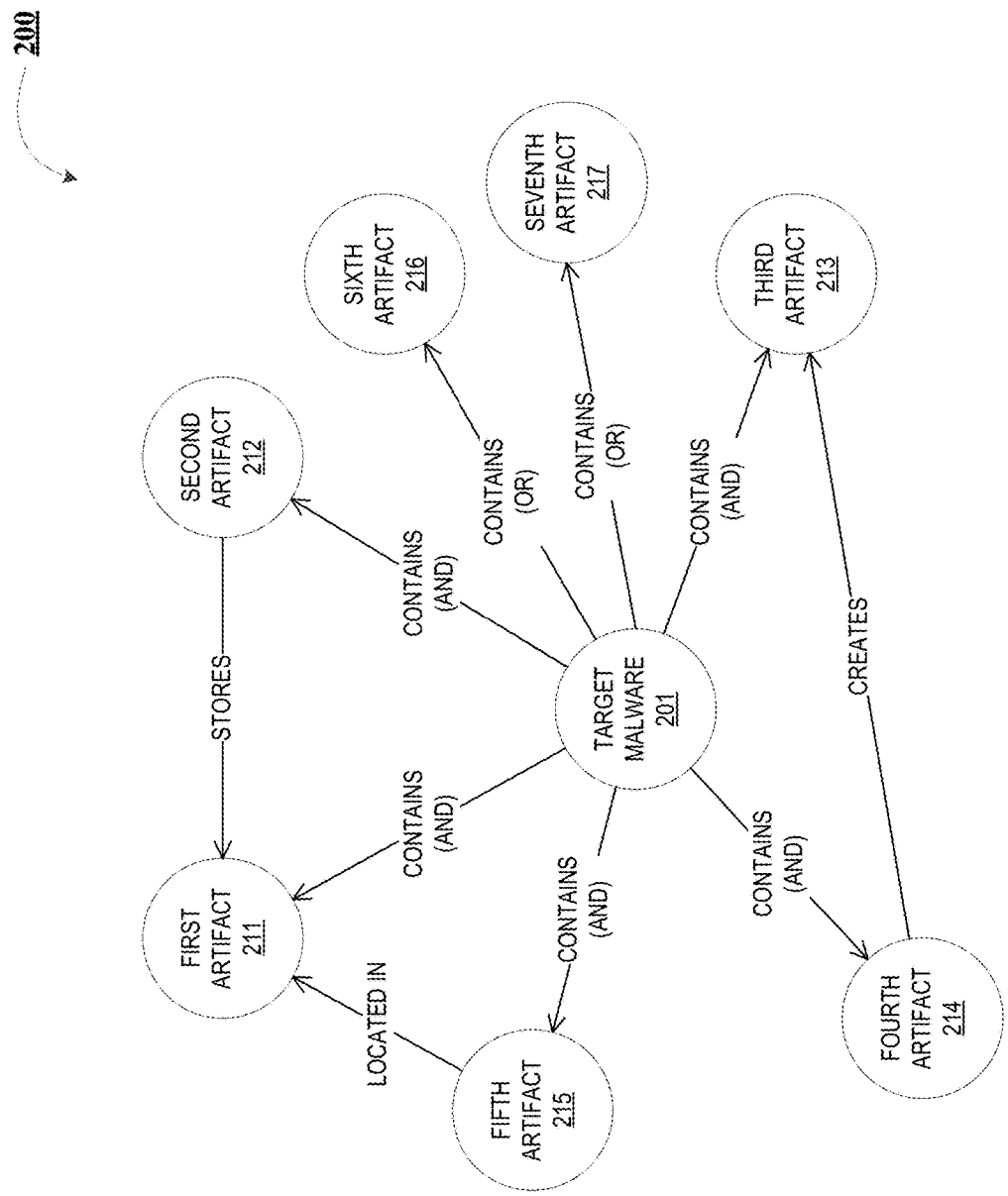
Figure 3:
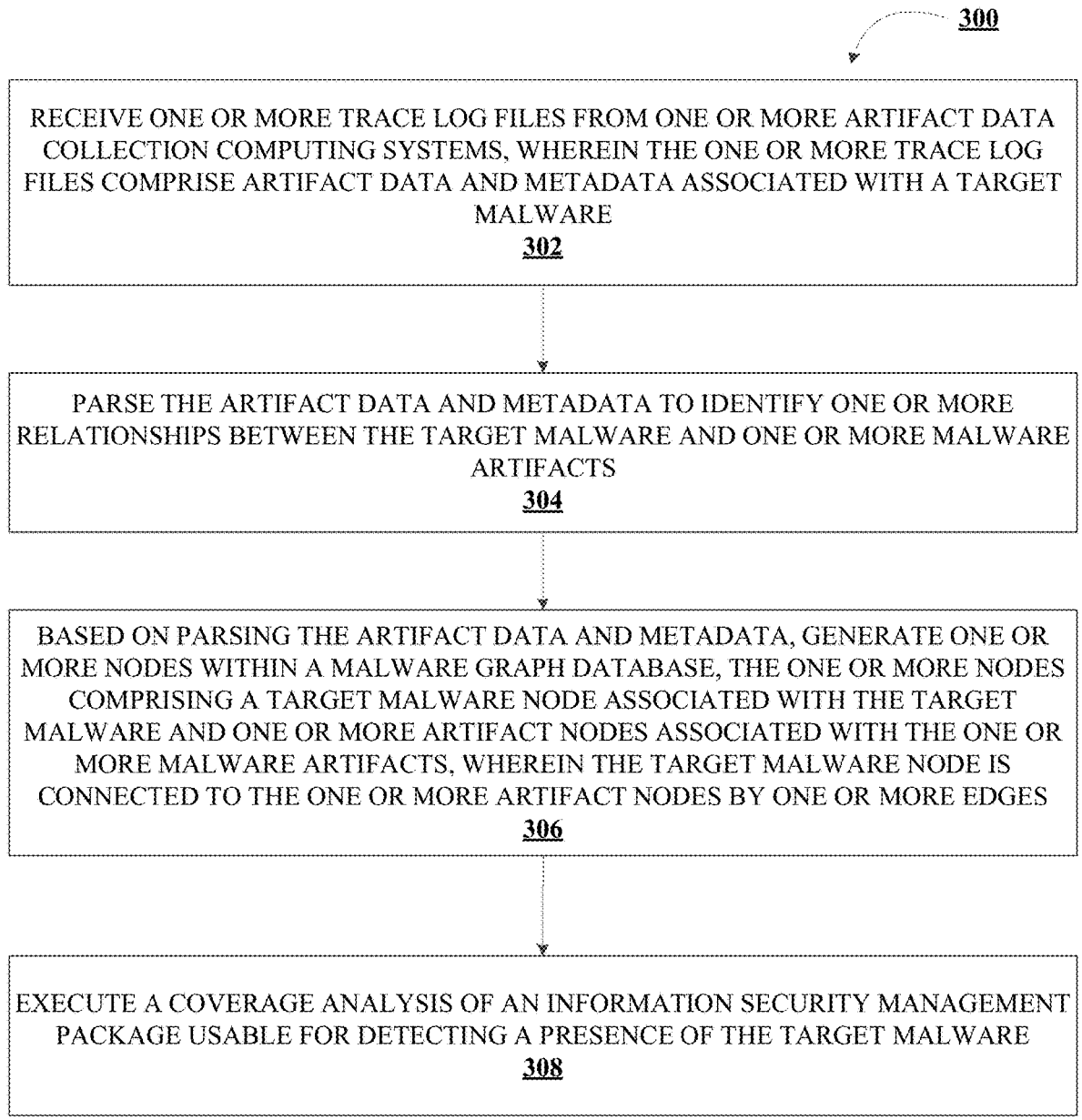

Having thus described embodiments of the invention in general terms, reference will now be made the accompanying drawings, wherein:

FIG. 1 illustrates technical components of a system for generating information security management packages through malware tracing, logging, and analysis, in accordance with an embodiment of the invention;

FIG. 2 illustrates a diagram for the data structures in an exemplary malware artifact graph database, in accordance with an embodiment of the invention; and FIG. 3 illustrates a process flow for generating information security management packages through malware tracing, logging, and analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, organization, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be externally-controllable code that encapsulates powerful logic designed to perform or execute a specific type of function. In one aspect, an engine may be underlying source code that establishes file hierarchy, input, and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the protocol. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (e.g., rotationally coupled, pivotally coupled, and/or the like). Furthermore, "operatively coupled" or "communicatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "malware" may refer to software that has been designed or configured to cause disruptive, intrusive, or unauthorized consequences to a network, computing system, and/or other associated structures or components. Examples of malware may include computer viruses, Trojan horses, spyware or adware, ransomware, worms, and/or the like.

As used herein, an "attack" or "intrusion" may refer to an instance of disruptive, intrusive, unintended, or otherwise unauthorized activity that takes place within a computing system or network of the entity. Examples of such attacks or intrusions may include malware, data exfiltration, authentication cracking, and the like.

As used herein, an "artifact" or a "threat artifact" may refer to an object that indicates that an attack or intrusion on a computing system or network has occurred (e.g., infection of a computing system by malware). Accordingly, examples of such artifacts may include data files, registry paths and/or entries, network communications, data libraries, executed commands, or the like that may be created or processed during the course of the attack or intrusion.

As used herein, an "information security management packages" or a "security package" may refer to logic, rules, queries, data, and/or the like that may be used by the entity to detect the presence of security issues within the computing systems within the entity's network (e.g., malware). Accordingly, security packages may, when executed, be configured to scan the potentially affected computing systems for artifacts associated with the malware to be detected. Upon identifying the malware based on the associated artifacts, the security package may cause a notification to be displayed on the affected computing system, where the notification comprises an alert indicating that the malware has been identified. In some embodiments, the security package may further initiate one or more remediation processes in response to identifying the malware (e.g., performing removal of the malware from the computing system).

In some embodiments, each security package may be referred to as a "use case," where the use case takes the form of a query that may be structured to return a search result that indicates the presence of a target malware. In such embodiments, executing the security package may comprise inputting the use case, which takes the form of a query, into a security tool, where the security tool may execute a search of the computing resources within the network environment based on the query. The security tool may be, for instance, a Security Information and Event Management ("SIEM") tool that has been customized to the organization's environment and their specific needs, such as analysis, alerting, compliance, and/or the like.

Embodiments of the present disclosure provide a system for generating information security management packages through malware tracing, logging, and analysis. The system may comprise one or more intrusion data collection agents, which may refer to computing devices configured to log the activities and/or behavior associated with attacks on computing systems within the network. In particular, the collection agents may log artifact data associated with the attacks, where the artifact data may comprise information related to artifacts generated by malware. Examples of such artifacts may include, for instance, registry entries created by malware, data transmitted to specific IP addresses or domains, data files (e.g., binary executables) that have been created, executed, read, or modified by the malware, application programming interface ("API") calls made by the malware, image loads by the malware, and/or the like.

Upon collecting the artifact data, the collection agents may store the artifact data in trace log files associated with the particular malware sample to be analyzed (or "target malware"). Accordingly, each trace log file may contain the artifact data along with metadata associated with the artifact data. In an exemplary embodiment, a trace log file may indicate that a sample of malware (e.g., "Malware A") has attempted to establish contact with a remote host having an IP address of 123.4.5.678. Accordingly, the trace log file may include the content data itself (e.g., the IP address value) along with a "field" associated with the content data (e.g., a descriptor such as "RemoteHostIP"). A trace log file may be generated for each instance in which the malware sample is executed. As such, multiple trace log files may be generated with respect to a particular type of malware, such that any differences in artifacts may be generated across the individual log files. For example, Malware A may attempt to remotely access a first IP address in a first instance, but access a second IP address in a second instance. In such scenarios, a first trace log file may capture the first instance, while a second trace log file captures the second instance. In this way, the system may be able to account for variances in the activity or behavior of a particular type of malware.

It should be appreciated that the scope of the disclosure is not intended to be restricted to the exemplary artifacts described herein. For instance, artifact data and/or metadata may include information about other types of artifacts that may be dependent on the environment into which the system is implemented (e.g., operating system, hardware configuration, installed applications, drivers, and/or the like).

In some embodiments, the collection agents may be configured to purposely execute (or "detonate") known instances of malware in order to perform the logging activities described above. In such embodiments, the collection agents may detonate the malware within an isolated sandbox environment and log the various artifacts associated with the malware that are created from detonating the malware.

Once the trace log files have been generated, the system may ingest and parse the artifact data found within the trace log files to populate a graph database (e.g., a malware artifact graph database), where the graph database comprises information regarding specific types of malware along with the artifacts with which each type of malware is associated. In this regard, each artifact, along with the malware with which each artifact is associated, may be represented within the graph database as nodes (or "vertices"), where each node comprises one or more properties that define the node. For instance, a node may be generated for a data file, where the properties of the node may include a filename or file extension associated with the data file.

The various nodes may be linked to one another by "relationships" or "edges" within the graph database, where each relationship comprises one or more descriptors that describe the relationship between the nodes in a single or bi-directional manner. Continuing the above example, a node may be generated for Malware A, and another node may be generated for a process executed by Malware A (e.g., Process A). Accordingly, the system may define a relationship from the node for Malware A to the node for Process A, where the relationship comprises a descriptor such as "contains" or "executes" to indicate that Malware A executes Process A. In turn, Process A, when executed by Malware A, may generate Data File A. In such embodiments, the system may establish a relationship between the node for Process A to the node for Data File A, where the relationship comprises a descriptor such as "creates" to indicate that Data File A is created by Process A. In this way, the system may create a database that provides an understanding of how the various artifacts associated with malware are related to one another.

In some embodiments, the artifact data and/or metadata ingested by the system may comprise additional types of data and/or metadata to be used when constructing the malware graph database. For instance, the system may ingest security intelligence context data and/or MITRE ATT&CK mappings which may then be added to the malware graph database to provide additional context to a particular malware sample and/or use case (e.g., by appending additional properties to existing nodes and/or creating new nodes and relationships).

As noted above, the system may generate a trace log file for each instance in which a malware sample is evaluated, where each successive trace log file may contain certain differences in the artifacts associated with each instance. For example, a particular type of malware may always generate a certain data file and a registry entry while only generating other registry entries based on certain conditions precedent. In such embodiments, the graph database may further define Boolean relationships between the nodes for malware and the nodes for the associated artifacts, where the Boolean relationships may be defined by logical operators such as AND, OR, NOT, and/or the like. In this way, the system may be able to capture the different variations of a particular piece of malware.

Based on the nodes and relationships in the graph database, an information security management package associated with the malware may be generated and stored within an information security management package database. The package may take the form of a query that, when inputted into a SIEM tool, causes the SIEM tool to perform a scan of a target computing system based on the various pathways defined by the relationships of the malware to the various artifacts. If the scan detects the presence of the artifacts associated with the malware in accordance with the logical operators and content values, the system may determine that a match has been found (e.g., the malware has been detected on the target computing system). Based on determining that a match has been found, the package may cause a notification to be displayed on the target computing system, where the notification indicates that the specified malware has been detected on the target computing system. In some embodiments, the system may further be configured to initiate one or more remediation processes in response to determining that a match has been found.

In some embodiments, the information security management package may be constructed by a user based on viewing the information associated with the target malware within the malware graph database. In particular, the query may traverse the pathways created by the target malware node, associated artifact nodes, and the edges connecting the target malware nodes and/or the associated artifact nodes. The query may further be constructed by the user to take into account any logical operators associated with the pathways. In other embodiments, the information security management package may be generated automatically by the system based on the information within the malware graph database.

In some embodiments, as new trace log files are added with respect to a target malware, the system may further perform an analysis of the existing packages within the information security management package database. In this regard, the system may iterate through the various pathways and logical operators as defined within the package and compare the results with the information within the malware artifact graph database with respect to the target malware. Based on the analysis, the system may determine whether a particular package provides full coverage of the malware (e.g., the package is able to detect all known variations or instances of the target malware) or partial coverage (e.g., the package does not account for at least one variation or instance of the target malware). The system may save the results of the analysis to the information security management package database. In some embodiments, based on determining that a package provides only partial coverage with respect to the target malware, the system may determine that the package requires an update, and subsequently update the package by pulling the updated nodes and relationships associated with the target malware from the malware artifact graph database.

The system as described herein provides a technical solution to the technical problem of malware analysis and detection. In particular, by iteratively logging and mapping artifacts associated with malware into a graph database along with the relevant logical operators, the system may generate a database that provides a more detailed understanding of the behaviors and activities of the target malware. Furthermore, by evaluating the packages within the information security management package database, the system may ensure that each package provides the most comprehensive coverage possible for detecting the presence of malware within a target computing system.

Turning now to the figures, FIG. 1 presents an exemplary block diagram of a system environment for generating information security management packages through malware tracing, logging, and analysis 100, in accordance with an embodiment of the invention. FIG. 1 provides a unique system that includes specialized servers and system communicably linked across a distributive network of nodes to perform the functions of the process flows described herein in accordance with embodiments of the present invention.

As illustrated, the system environment 100 includes a network 110, a system 130, a user input system 140, and technology infrastructure 180. The user input system 140 may be a mobile device or other non-mobile computing device. In some embodiments, the user input system 140 may be used by a user who is authorized to execute one or more interactions with the system 130 and/or the technology infrastructure 180 using the one or more applications stored thereon. The one or more applications may be configured to communicate and interact with the system 130 and/or the technology infrastructure 180, input information onto a user interface presented on the user input system 140, or the like. The applications stored on the user input system 140, the system 130, and the technology infrastructure 180 may incorporate one or more parts of any process flow described herein.

As shown in FIG. 1, the system 130, the user input system 140, and the technology infrastructure 180 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130, the user input system 140, and the technology infrastructure 180 may be used to implement the processes described herein. The system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. The user input system 140 is intended to represent various forms of mobile devices, such as personal digital assistants, cellular telephones, smartphones, and other similar computing devices. The technology infrastructure 180 is intended to represent hardware components such as routers, network switches, server rooms/data centers, physical plant, computing devices (such as mobile devices, laptops, desktops, and/or the like), and/or the like, software components such as applications, network resources configured to enable communication between the various components, and personnel resources that operate the hardware components and the software components. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low-speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system 130 may dynamically utilize the volatile memory over the non-volatile memory by storing multiple pieces of information in the volatile memory, thereby reducing the load on the system 130 and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, the technology infrastructure 180. In some embodiments, the system 130 may be configured to access, via the network 110, the dedicated databases that aggregate and store security information from various components within the technology infrastructure 180. For instance, the system 130 may be configured to access, via the network 110, the trace log files, malware artifact graph databases, and/or the information security management package databases, which may be stored on the technology infrastructure 180. In some embodiments, the system 130 may be configured to access, via the network 110, the dedicated databases that aggregate and store security information from various components within the technology infrastructure 180.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a system 130 that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system 130 can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a diagram for the data structures 200 within an exemplary malware artifact graph database, in accordance with an embodiment of the invention. As seen in FIG. 2, the exemplary graph database may include nodes representing the target malware 201 and the various artifacts associated with the target malware 201 (e.g., the first artifact 211, second artifact 212, third artifact 213, fourth artifact 214, fifth artifact 215, sixth artifact 216, seventh artifact 217). The target malware 201 may be designated as having a "contains" relationship with the various artifacts 211, 212, 213, 214, 215, 216, 217 which may indicate that the artifacts 211, 212, 213, 214, 215, 216, 217 are generated by the target malware 201. In an exemplary embodiment, the first artifact 211 may represent a registry key (or any other type of registry entry) generated by the target malware 201. In such an embodiment, the second artifact 212 may represent a registry path in which the registry key (e.g., first artifact 211) is stored, and the fifth artifact 215 may represent a registry value stored located in the registry key (e.g., first artifact 211), as indicated by the directional relationships between the first artifact 211, second artifact 212, and fifth artifact 215.

Continuing the example, the fourth artifact 214 may represent a process that is executed by the target malware 201, and the third artifact 213 may represent a data file generated as a result of executing the process (e.g., fourth artifact 214), as indicated by the relationship between the fourth artifact 214 and the third artifact 213. Finally, the sixth artifact 216 may represent a first remote host IP address and seventh artifact 217 may represent a second remote host IP address to which the target malware 201 has transmitted data. It should be understood that the various nodes may be added to the exemplary graph database as a result of an iterative process of collecting and ingesting trace log files over time.

For example, the target malware 201 may attempt to access the first remote host IP address (represented by the sixth artifact 216) in a first instance, and attempt to access the second remote host IP address (represented by the seventh artifact 217) in a second instance. However, in both the first instance and the second instance, the target malware 201 generated the registry key (e.g., first artifact 211) having the registry value (e.g., fifth artifact 215) and stored in the registry path (e.g., second artifact 212), and further executes the process (e.g., fourth artifact 214) which generates the data file (e.g., third artifact 213). In such an embodiment, the relationships between the target malware 201 and the first artifact 211, second artifact 212, third artifact 213, fourth artifact 214, and fifth artifact 215 may be characterized and associated with the "AND" logical operator, whereas the relationships between the target malware 201 and the sixth artifact 216 and the seventh artifact 217 may be characterized and associated with the "OR" logical operator. In certain scenarios, such as when a particular artifact is mutually exclusive with the target malware 201, the relationship between the target malware 201 and said artifact may be characterized and associated with the "NOT" logical operator. By mapping the various artifacts associated with the target malware 201 in this manner, the system may provide a detailed and comprehensive view of the behaviors and activities of the target malware 201. In turn, the generated information security management packages may account for the various logic-gated pathways associated with the relationships between the target malware 201 and associated artifacts, thereby increasing the accuracy with which the packages are able to detect the presence of the target malware 201 on the target computing system.

FIG. 3 illustrates a process flow for generating information security management packages through malware tracing, logging, and analysis, in accordance with an embodiment of the invention. As shown in block 302, the process flow includes receiving one or more trace log files from one or more artifact data collection computing systems (where the artifact data collection computing systems may be a part of the technology infrastructure 180 as depicted in FIG. 1), wherein the one or more trace log files comprise artifact data and metadata associated with a target malware. The trace log files may be generated each time that the target malware is executed on an artifact data collection computing system. In some embodiments, the trace log files may be transmitted (or "pushed") to the system by the artifact data collection computing systems, where the artifact data collection computing systems may be computing systems within the entity's network environment that are specifically configured to execute the target malware and generate the trace log files. In other embodiments, the artifact data collection computing system may be a computing system owned and/or operated by a third party, such as a customer of the entity. In yet other embodiments, the artifact data collection computing system may be an integrated module or component of the system. The artifact data and metadata in each trace log file may contain information about the various artifacts created by the target malware upon execution. For instance, the target malware may execute process, create files and/or registry entries, communicate with outside computing systems, modify data files, and/or the like as part of its programmed behavior. In some embodiments, the trace log files may be stored in json format.

Next, as shown in block 304, the process flow includes parsing the artifact data and metadata to identify one or more relationships between the target malware and one or more malware artifacts. In this regard, the system may read the artifact data and metadata to determine the various properties associated with a particular artifact. For instance, if the artifact is a process executed by the target malware, the artifact data and metadata may include a process name, working directory, file type, command line or terminal commands, hash output value of the process (e.g., an SHA or MD5 hash output of the data file associated with the process) and/or the like. If the artifact is a registry key, the artifact data and metadata may include a registry key name or label, registry value associated with the registry key, a registry path in which the registry key is stored, the type of registry key, and/or the like. If the artifact is a connection to a remote host, the artifact data and metadata may include an IP address, port, domain, and/or the like.

Next, as shown in block 306, the process flow includes, based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges. In some embodiments, the malware graph database, along with the nodes therein, may be the exemplary graph database as depicted in FIG. 2 and described elsewhere herein. Each of the nodes may comprise one or more properties that define and describe the attributes of the node. For instance, the malware node may include properties that define a malware name, affected operating system, version or variant ID, and/or the like. An artifact node may have properties that are dependent on the type of artifact.

For instance, a registry key node may comprise properties that define a registry value, registry path, registry key type, and/or the like. A data file artifact may comprise properties that define a file name, storage path, working directory, hash value, and/or the like. Furthermore, each edge may comprise a property that further defines the nature of the relationship between the nodes connected by the edge. The edges may be unidirectional (e.g., from node A to node B) or bidirectional (e.g., back and forth between node A and node B). In some embodiments, each edge between the malware node and the one or more artifact nodes may further comprise a property defining a logical operator associated with the relationship between the malware node and specific artifact node (e.g., a Boolean operator such as AND, OR, NOT, and/or the like).

In some embodiments, the system may further define one or more edges between the various artifact nodes (or a "second set of edges"). For instance, a data file node may be created by a process node. In such an embodiment, an edge may be created from the process node to the data file node, where the edge comprises a property indicating that the data file is created by the process. If a registry value is located within a registry key, an edge may be created from a registry value node to a registry key node, where the edge comprises a property indicating that the registry value is contained in the registry key node.

Next, as shown in block 308, the process flow includes executing a coverage analysis of an information security management package usable for detecting a presence of the target malware. In this regard, the package may comprise a query such that the system may import the package into the security tool for detecting the presence of the target malware. Executing the coverage analysis may comprise retrieving an information security management package for evaluation from the database and parsing the detection logic within the information security management package. The system may then compare the parsed detection logic with the information within the malware graph database to compute a coverage level associated with the package with respect to a particular target malware. In some embodiments, the coverage level may be expressed as a coverage percentage, where the coverage percentage may indicate the percentage of nodes and/or relationships associated with the target malware that are covered by the package. In some embodiments, the system may determine, based on the coverage level, that the package provides full coverage (e.g., the package covers all known instances or iterations of the malware as defined by the graph database). In such an embodiment, the system may then determine that the package is up to date. In other embodiments, the system may determine that the package provides partial coverage (e.g., the package does not cover certain instances or iterations of the malware as defined by the graph database). In this regard, the system may detect that the package does not cover certain nodes and/or relationships as defined in the graph database with respect to the target malware. In such embodiments, the system may determine that the package requires an update and may subsequently modify the package based on the malware graph database. For example, in some embodiments, the system may determine that the package requires an update by comparing the coverage percentage with a coverage percentage threshold. If the coverage percentage for a package is computed to be below the coverage percentage threshold, the system may determine that the package requires an update.

In some embodiments, the process may include updating the information security management package. In an exemplary embodiment, the coverage analysis may indicate that the information security management package does not cover one or more pathways defined by the target malware node, artifact nodes, and the relationships between the target malware node and/or the artifact nodes (e.g., certain nodes, relationships, and/or logical operators are missed by the query). In such embodiments, a user (e.g., an employee or administrator of the entity) may modify the query within the security package to cover the missing nodes, relationships, and/or logical operators (e.g., updating the information security management package is based on user input). In other embodiments, the system may automatically update the security package based on the information within the malware graph database.

In some embodiments, the process may comprise generating information security management packages based on the information within the malware graph database. Accordingly, generating the information security management package may comprise tracing the pathways, including logical operations, from the target malware node to the one or more artifact nodes and constructing detection logic based on the pathways for detecting the artifacts. In this regard, the detection logic may be configured to, when executed, scan a target computing system for the one or more malware artifacts according to the logical operators associated with the one or more artifact nodes. In some embodiments, the package may further be configured to, when executed, display a notification indicating that the target malware has been detected.

Once the information security management packages have been generated, the packages may be stored within an information security management package database. In this regard, the information security management package database may comprise the various information security management packages compiled by the system over time. In some embodiments, the system may be configured to execute a coverage analysis for the various information security management packages within the database.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for generating information security management packages through malware analysis, the system comprising:
   at least one non-transitory storage device; and
   at least one processing device coupled to the at least one non-transitory storage device, wherein the at least one processing device is configured for:
      receiving one or more trace log files from one or more artifact data collection computing systems, wherein the one or more trace log files comprise artifact data and metadata associated with a target malware;
      parsing the artifact data and metadata to identify one or more relationships between the target malware and one or more malware artifacts;
      based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges, wherein each edge defines a relationship between the target malware and one of the one or more malware artifacts; and
      executing a coverage analysis of an information security management package usable for detecting a presence of the target malware, wherein executing the coverage analysis comprises:
         based on the malware graph database, computing a coverage level for the information security management package; and
         based on the coverage level, determining whether to update the information security package.

2. The system of claim 1, wherein executing the coverage analysis comprises:
   parsing detection logic within the information security management package; and
   comparing the parsed detection logic to the malware graph database.

3. The system of claim 1, wherein executing the coverage analysis further comprises:
   determining, based on the coverage level, that the information security management package provides partial coverage with respect to the target malware; and
   updating the information security management package.

4. The system of claim 3, wherein updating the information security management package further comprises:
   modifying a query within the information security management package, wherein the query identifies at least one of the one or more nodes and the one or more edges.

5. The system of claim 1, wherein the at least one processing device is further configured for generating the information security management package, wherein generating the information security management package comprises:
   tracing one or more logical pathways from the target malware node to the one or more artifact nodes within the malware graph database; and
   constructing detection logic for detecting the one or more malware artifacts based on the one or more logical pathways.

6. The system of claim 1, wherein the one or more malware artifacts comprise at least one of a process executed by the target malware, a data file created by the target malware, a registry entry created by the target malware, API calls made by the target malware, image loads accessed by the target malware, or a remote host accessed by the target malware.

7. The system of claim 6, wherein the one or more artifact nodes comprises a process artifact node, the process artifact node comprising one or more properties indicating at least one of a process name, working directory, and hash output value associated with the process.

8. The system of claim 6, wherein the one or more artifact nodes comprises a data file artifact node, the data file artifact node comprising one or more properties indicating at least one of a file name, file type, or storage location associated with the data file.

9. The system of claim 6, wherein the one or more artifact nodes comprises a registry key node associated with a registry key, the registry key node comprising one or more properties indicating at least one of a registry key type, registry value, or registry path associated with the registry key.

10. The system of claim 6, wherein the one or more artifact nodes comprises a remote host node, the remote host node comprising one or more properties indicating at least one of an Internet Protocol ("IP") address, port, or domain associated with the remote host.

11. The system of claim 1, wherein executing the coverage analysis further comprises:
based on determining that the coverage level exceeds a threshold value, validating the information security management package.

12. The system of claim 1, wherein computing a coverage level for the information security management package further comprises:
computing a coverage percentage, wherein the coverage percentage indicates a percentage of the one or more nodes that is detectable by the information security management package.

13. A computer program product for generating information security management packages through malware analysis, the computer program product comprising a non-transitory computer-readable medium comprising code causing a first apparatus for:
receiving one or more trace log files from one or more artifact data collection computing systems, wherein the one or more trace log files comprise artifact data and metadata associated with a target malware;
parsing the artifact data and metadata to identify one or more relationships between the target malware and one or more malware artifacts;
based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges, wherein each edge defines a relationship between the target malware and one of the one or more malware artifacts; and
executing a coverage analysis of an information security management package usable for detecting a presence of the target malware, wherein executing the coverage analysis comprises:
based on the malware graph database, computing a coverage level for the information security management package; and
based on the coverage level, determining whether to update the information security package.

14. The computer program product of claim 13, wherein executing the coverage analysis comprises:
parsing detection logic within the information security management package; and
comparing the parsed detection logic to the malware graph database.

15. The computer program product of claim 13, wherein executing the coverage analysis further comprises:
determining, based on the coverage level, that the information security management package provides partial coverage with respect to the target malware; and
updating the information security management package.

16. The computer program product of claim 13, wherein the first apparatus is further configured for generating the information security management package, wherein generating the information security management package comprises:
tracing one or more logical pathways from the target malware node to the one or more artifact nodes within the malware graph database; and
constructing detection logic for detecting the one or more malware artifacts based on the one or more logical pathways.

17. The computer program product of claim 13, wherein the one or more malware artifacts comprise at least one of a process executed by the target malware, a data file created by the target malware, a registry entry created by the target malware, API calls made by the target malware, image loads accessed by the target malware, or a remote host accessed by the target malware.

18. A computer-implemented method for generating information security management packages through malware analysis, the computer-implemented method comprising:
receiving one or more trace log files from one or more artifact data collection computing systems, wherein the one or more trace log files comprise artifact data and metadata associated with a target malware;
parsing the artifact data and metadata to identify one or more relationships between the target malware and one or more malware artifacts;
based on parsing the artifact data and metadata, generating one or more nodes within a malware graph database, the one or more nodes comprising a target malware node associated with the target malware and one or more artifact nodes associated with the one or more malware artifacts, wherein the target malware node is connected to the one or more artifact nodes by one or more edges, wherein each edge defines a relationship between the target malware and one of the one or more malware artifacts; and
executing a coverage analysis of an information security management package usable for detecting a presence of the target malware, wherein executing the coverage analysis comprises:
based on the malware graph database, computing a coverage level for the information security management package; and
based on the coverage level, determining whether to update the information security package.

19. The computer-implemented method of claim 18, wherein executing the coverage analysis comprises:
parsing detection logic within the information security management package; and
comparing the parsed detection logic to the malware graph database.

20. The computer-implemented method of claim 18, wherein executing the coverage analysis further comprises:
  determining, based on the coverage level, that the information security management package provides partial coverage with respect to the target malware; and
  updating the information security management package.

21. The computer-implemented method of claim 20, wherein updating the information security management package comprises modifying detecting logic within the information security management package based on user input.

22. The computer-implemented method of claim 18, wherein the computer-implemented method further comprises generating the information security management package, wherein generating the information security management package comprises:
  tracing one or more logical pathways from the target malware node to the one or more artifact nodes within the malware graph database; and
  constructing detection logic for detecting the one or more malware artifacts based on the one or more logical pathways.

23. The computer-implemented method of claim 18, wherein the one or more malware artifacts comprise at least one of a process executed by the target malware, a data file created by the target malware, a registry entry created by the target malware, API calls made by the target malware, image loads accessed by the target malware, or a remote host accessed by the target malware.

\* \* \* \* \*